United States Patent [19]

Paczkowski

[11] 4,448,577
[45] May 15, 1984

[54] DEVICE FOR PRODUCTION OF INERT GASES

[75] Inventor: Marian Paczkowski, Katowice, Poland

[73] Assignee: Glowny Instytut Gornictwa, Katowice, Poland

[21] Appl. No.: 344,101

[22] Filed: Jan. 29, 1982

[30] Foreign Application Priority Data

Jan. 29, 1981 [PL] Poland .................................. 229466

[51] Int. Cl.³ ............................................. F23L 9/00
[52] U.S. Cl. ........................................ 431/190; 431/4; 60/39.55; 60/39.59
[58] Field of Search .................... 431/4, 190; 60/39.53, 60/39.55, 39.59, 39.07

[56] References Cited

U.S. PATENT DOCUMENTS 1,828,784 10/1931 Perrin ................................ 60/39.59

FOREIGN PATENT DOCUMENTS 101017 4/1979 Poland .

Primary Examiner—Carroll B. Dority, Jr.
Attorney, Agent, or Firm—Ladas & Parry

[57] ABSTRACT

The invention solves the problem of production of inert gases by way of liquid fuel combustion and diffusion of combustion products with water in a device having small overall dimensions and ensuring to obtain and pump large quantities of gases with the oxygen content well below 2% of the volume as well as minimum content of unburnt fuel particles and, furthermore, devoid of dissociation products. The device consists of a turbo-compressor and tightly connected chambers for oxygen pre-reduction, fuel atomizers, combustion, mixing, after burning and diffusion cooling. The pre-reduction chamber preferably has four flame tubes with fuel injectors and sparking plugs and the chamber of the fuel atomizers in equipped with two circumferential rows of atomizers. One of thereof is a row of counter-current atomizers located opposite the exhaust gas outlet from the flame tubes whereas the forms a row of parallel-current atomizers placed in the channels which are made up between the partitions that support the internal tube. Behind the chamber of atomizers on the outlet way of exhaust gases, that have undergone pre-reduction from oxygen, two further chambers are situated, the first of these equipped with parallel-current atomizers of additional fuel with sparking plug makes up the combustion chamber, the second fitted at the front with a diffuser and a counter-current central water nozzle forms the after-burning and preliminary cooling chamber before the basic diffusion cooling and evaporation in the last chamber.

1 Claim, 4 Drawing Figures

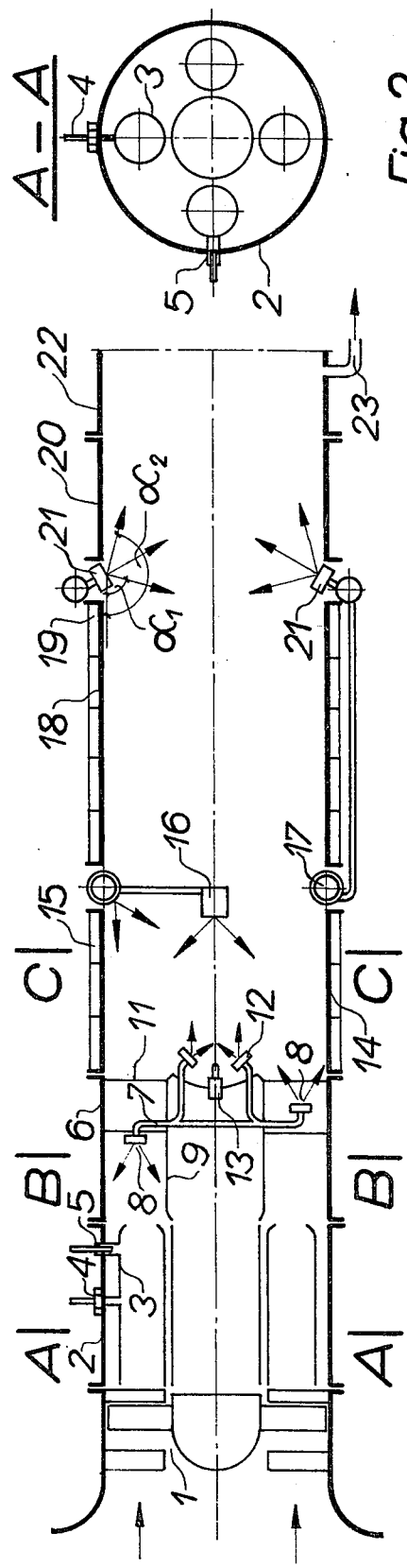
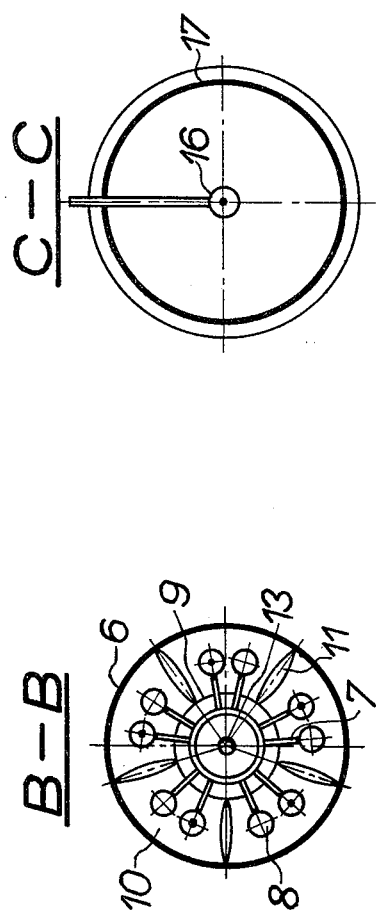
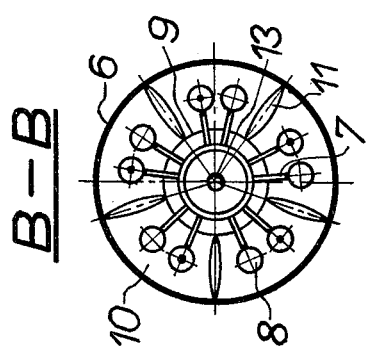

DEVICE FOR PRODUCTION OF INERT GASES

The object of this invention is a device for production of inert gases through combustion of liquid fuel and diffusion of combustion products with water, used particularly to prevent and extinguish undergound fires.

Already known, for example, from the Polish patent description No. 101 017 is a device for production of inert gases which is fitted with a compressor mounted on a shaft of a gas turbine. The device assembled on the basis of an aircraft engine has several tightly connected chambers. The first one of them in the form of a combustion chamber of the engine, following the pre-reduction chamber, houses a set of reactive nozzles for additional fuel and it is connected with the after-burning chamber equipped with a water jacket. Behind the after-burning chamber there is a diffusion cooling chamber fitted with sets of circumferential located water, carbon dioxide or liquid nitrogen nozzles. The use of a turbine engine for combustion with the simultaneous utilization of reactive nozzles of additional fuel, as well as after-burning and diffusion cooling chambers with circumferential located water nozzles, causes reduction of oxygen to a concentration slightly more than 2% by volume; furthermore, the obtained gases contain unburnt particles of fuel and of dissociation products which extends the time needed to inert the gaseous atmosphere and thus the time of conducting the dangerous fire extinguishing operations in large underground areas containing methane.

The device for producing a mixture of steam and gas known for USSR patent description No. 231 502 and the inert gas generator, known for example from USSR patent description No. 571 615 also have the aforenamed faults and drawbacks. The first of these appliances, fitted with a blower which feeds air into the water-cooled chamber in the form of frustum of a cone, in which oxygen is reduced by burning liquid fuel, is characterized by a relatively large content of unburnt fuel and an insufficient degree of oxygen reduction in gases. Whereas, the second of the two appliances with an afterburning chamber in the form of frustum cone, supplied with air from the reaction nozzle of the turbojet, besides having low efficiency, creates the danger of the flame being transferred outside the open air suction ejector system in case of gas flow trouble, for example during explosions or falling of roof in the fire field.

The aim of the invention is the construction of such an appliance for producing inert gases by way of liquid fuel combustion and diffusion of combustion products with water which, in connection with small overall dimensions, would guarantee the obtaining and pumping of large quantities of gases with the oxygen content well below 2% of the volume, as well as a minimum content of unburnt fuel particles and, furthermore, devoid of diffusion products.

This aim has been reached in a device based on the invention consisting of a turbo-compressor and tightly connected chambers of oxygen pre-reduction, fuel atomizers, combustion, mixing, after-burning and diffusion cooling fitted with a set of circumferential water nozzles. The essence of the invention is in the fact that the pre-reduction chamber preferably has four flametubes with fuel injectors and sparking plugs, whereas the fuel atomizer chamber is fitted with two rows of atomizers on the circumference. One row forms the counter-current atomizers mounted on the opposite side to the outlet of exhaust-gases emitted by the flame tubes, while the other forms parallel current atomizers mounted in the channels which are made between partitions that support the internal tube of the chamber. Two further chambers are located behind the atomizer chamber on the outlet of exhaust gases which have undergone pre-reduction in oxygen. The first chamber fitted with parallel current additional fuel atomizers with sparking plugs makes up the combustion chamber, while the second chamber equipped at the front with a diffuser and a centre counter-current water nozzle forms the after-burning and pre-cooling chamber before the basic diffusion cooling and evaporation in the last chamber.

The device according to the invention allows the production of misty inert gases with an oxygen content below 1% of volume and temperature 355 K., at the same time free of dissociation products. Furthermore, the device consists of light, easily mounted and easily transportable sub-assemblies, safe to use even in an atmosphere filled with methane. They are also reliable and easy to use. The device operates irrespective of whether the air is being pumped though a blower as in the USSR patent description No. 231 502 or by using a tubine engine as a in the Polish patent description No. 101 017.

The drawing presents the machine according to the invention in sample execution where FIG. 1 gives a general outline diagram, FIG. 2—cross-section along the line A—A marked on FIG. 1, FIG. 3—cross-section along the line B—B marked on FIG. 1 and FIG. 4—cross-section along the line C—C also marked on FIG. 1.

The device for producing inert gases consists of a turbo-compressor 1 and a series of tightly connected chambers. The first chamber 2 of oxygen pre-reduction has, for example, four flame tubes 3, evenly spaced out on its inner diameter, and is fitted with liquid oil fuel injectors 4 and sparking plugs 5. The second ring chamber 6 of additional fuel atomizers is equipped with two circumferential rows of atomizers 7, 8. One is a row of counter-current atomizers 7 located on the axis of the ring that is formed between the chamber wall 6 and internal tube 9, opposite the exhaust gas outlet from the flame tubes 3, whereas the other forms a row of parallel current atomizers 8 placed for example in the five channels 10 which are made up between the partitions 11 that support the internal tube 9. The internal tube 9 of the additional fuel atomizer chamber 6 is tipped with at least two succeeding additional fuel atomizers 12 and a sparking plug 13 which are already mounted in the combustion chamber 14. Behind the combustion chamber 14 equipped with a water jacket 15 there is a central counter-current water nozzle 16 located in the center of a circumferentially arranged spray diffuser 17 between chamber 14 and the fourth chamber 18 of after-burning also supplied with a water jacket. The chamber 18 is connected with the fifth chamber 20 for diffusion cooling of exhaust gases. It is fitted with a set of circumferential water nozzles 21 and connected to the ventilation pipe 22 with a waste water outlet 23 and further on to a pipe disposing of the inert gases into a separate space.

The production of inert gases by the device according to the invention is done in multi-stage fashion and begins with the feeding of air into the flame tubes 3 in the oxygen pre-reduction chamber 2. Whereas ignited oil fuel in the amount defined by the air excess ratio $\lambda=3.9$ is being constantly injected into the tubes 3. Then additional fuel is injected into the stream of exhaust gases in chamber 6 in the amount defined by the air excess ratio $\lambda=1.05$. Additional fuel is first injected counter-currentwise by means of atomizers 7, then parallel currentwise into channels 10 through atomizers 8 and finally still through succeeding atomizers 12. This fuel entirely evaporates and it is ignited by means of a sparking plug 13 only on reaching the combustion chamber 14. At the end of chamber 14 water is injected into the inner cone of the flame by means of the central water nozzle 16. This, together with the participation of the diffuser 17, cause cooling of the flame to a temperature below 1700 K., diffusion of its inner cone and mixing of gases in the after-burning chamber 18 where a complete after-burning of fuel particles and dissociation products takes place. In the diffusion cooling chamber 20 the exhaust gases are rapidly cooled by diffusion of water sprayed through nozzles 21 in such a way that the planes of the formed spray cones are at an angle of $\alpha_1=75°$ and $\alpha_2=175°$ in relation to the casing surface. The solution of fuel and fine water drops flows through the ventilation pipe causing gradual evaporation of water and the forming of misted inert gas which is forced into the fire area.

I claim:

1. In a device for producing inert gases by liquid fuel combustion and diffusion of combustion products with water, useful particularly to prevent and extinguish underground fires, comprising a turbo-compressor and tightly connected multiple stage chambers for preliminary reduction of oxygen, fuel atomization, after-burning, mixing and evaporation, the improvements which are characterized by providing a first cylindrical shaped inlet combustion chamber immediately downstream of said turbo-compressor, and including a circumferential array of burner tubes extending longitudinally of said chamber, each tube including a fuel injector means and downstream thereof a sparking means for combustion of fuel introduced by said fuel injector means, providing preliminary reduction of oxygen in said flame tubes, a second cylindrical chamber attached downstream of said first chamber and including fuel atomization means in the form of two circumferential rows of atomizers, one of which consists of a series of fuel nozzles facing upstream toward the outlet of said first chamber and said flame tubes therein, a second set of atomizers facing downstream parallel to flow through said second chamber, therebeing included a cylindrical internal tube mounted within said second chamber by means of radially extending partition means connected to the circumference of said second chamber and defining a series of axially arranged channels each containing one of said second set of atomizers therein, a third cylindrical chamber connected to the downstream end of said second chamber, therebeing a further set of supplemental fuel atomizers arranged in a concentric pattern around the central axis of said third chamber, sparking means arranged in the center of said third chamber, a fourth cylindrical chamber connected to the downstream end of said third chamber and providing a preliminary cooling means for exhaust gases flowing therethrough, said fourth chamber including a cylindrically arranged water jacket means for preliminary cooling of said gases, a centrally located water nozzle mounted between said third and fourth chambers for supplying a spray of water facing upstream of said flow toward said third chamber, and a circumferentially arranged spray diffuser means in the form of a ring mounted between said third and fourth chambers and also facing substantially upstream of said flow to supply with said centrally arranged nozzle, a pattern of water for preliminary cooling of said gases, a fifth cylindrical chamber connected to the downstream end of said fourth chamber, a circumferentially mounted set of water nozzles between said fourth and fifth chambers facing partially downstream of said direction of flow therethrough, including individual nozzles mounted at an angle with respect to the cylindrical chamber and defining thereby a spray pattern facing inwardly as well as downstream of said flow of gases, and a chamber connected to the downstream outlet end of said fifth chamber, whereby exhaust gases passing through said device provide for evaporation of water and forming of inert gases at the outlet end thereof.

* * * * *